(12) United States Patent
Dadon et al.

(10) Patent No.: US 12,549,161 B2
(45) Date of Patent: Feb. 10, 2026

(54) HIGH RESOLUTION, DIRECT SYNTHESIS OF QUBIT CONTROL SIGNALS

(71) Applicant: Quantum Machines, Tel Aviv (IL)

(72) Inventors: Achikam Dadon, Tel Aviv (IL); Oded Wertheim, Tel Aviv (IL); Asaf Rozen, Tel Aviv (IL); Yonatan Cohen, Tel Aviv (IL); Nissim Ofek, Tel Aviv (IL); Itamar Sivan, Tel Aviv (IL); Guy Osi, Tel Aviv (IL); Yuval Toren, Tel Aviv (IL)

(73) Assignee: Q.M Technologies Ltd. (IL)

( * ) Notice: Subject to any disclaimer, the term of this patent is extended or adjusted under 35 U.S.C. 154(b) by 105 days.

(21) Appl. No.: 18/522,452

(22) Filed: Nov. 29, 2023

(65) Prior Publication Data

US 2025/0175165 A1 May 29, 2025

(51) Int. Cl.
*H03K 3/38* (2006.01)
*G06N 10/20* (2022.01)
*H03K 19/195* (2006.01)
*H03M 1/66* (2006.01)

(52) U.S. Cl.
CPC ............. *H03K 3/38* (2013.01); *G06N 10/20* (2022.01); *H03K 19/195* (2013.01); *H03M 1/66* (2013.01)

(58) Field of Classification Search
CPC ........ H03K 3/38; H03K 19/195; G06N 10/20; H03M 1/66
USPC ............. 341/144; 326/3; 712/42, 16, 11, 14; 713/600; 711/212
See application file for complete search history.

(56) References Cited

U.S. PATENT DOCUMENTS

| | | | |
|---|---|---|---|
| 4,875,484 | A | 10/1989 | Anzai et al. |
| 5,063,354 | A | 11/1991 | Lauper et al. |
| 5,194,907 | A | 3/1993 | Hayashi |
| 5,684,418 | A | 11/1997 | Yanagiuchi |
| 6,223,228 | B1 | 4/2001 | Ryan et al. |
| 6,426,984 | B1 | 7/2002 | Perino et al. |
| 6,993,108 | B1 | 1/2006 | Chi et al. |
| 7,451,292 | B2 | 11/2008 | Routt |
| 7,535,931 | B1 | 5/2009 | Zampetti et al. |

(Continued)

FOREIGN PATENT DOCUMENTS

| | | |
|---|---|---|
| CA | 2420022 A1 | 2/2003 |
| CN | 1808103 A | 7/2006 |

(Continued)

OTHER PUBLICATIONS

ISSCC (IEEE) 2023 / SESSION 34 / CRYO-CMOS for Quantum Computing / 34.4 Kang et al A Cryogenic Controller IC for Superconducting Qubits with DRAG Pulse Generation by Direct Synthesis without Using (Year: 2023).*

(Continued)

*Primary Examiner* — Arnold M Kinkead
(74) *Attorney, Agent, or Firm* — McAndrews Held & Malloy, Ltd.

(57) ABSTRACT

Disclosed herein is a new paradigm for qubit control using clock multipliers and dual sampling rate direct synthesis to avoid Nyquist zone gaps while covering a wide spectrum without using any synthesizer that compromises the phase noise. This system and method for multi-Nyquist direct synthesis qubit control using clock multipliers and double sampling rate is scalable to thousands of RF channels synchronized to the picosecond level.

26 Claims, 6 Drawing Sheets

(56) References Cited

U.S. PATENT DOCUMENTS

| | | |
|---|---|---|
| 7,627,126 B1 | 12/2009 | Pikalo |
| 8,315,969 B2 | 11/2012 | Roetteler |
| 8,385,878 B2 | 2/2013 | Rao |
| 8,750,717 B1 | 6/2014 | Yap et al. |
| 9,207,672 B2 | 12/2015 | Williams |
| 9,400,499 B2 | 7/2016 | Williams |
| 9,509,324 B2 | 11/2016 | McDonald et al. |
| 9,663,358 B1 | 5/2017 | Cory et al. |
| 9,692,423 B2 | 6/2017 | McDermott, III |
| 9,847,121 B2 | 12/2017 | Frank |
| 9,858,531 B1 | 1/2018 | Monroe |
| 9,892,365 B2 | 2/2018 | Rigetti |
| 9,978,020 B1 | 5/2018 | Gambetta |
| 9,979,400 B1 | 5/2018 | Sete |
| 9,996,801 B2 | 6/2018 | Shim |
| 10,063,228 B2 | 8/2018 | Deurloo et al. |
| 10,122,351 B1 | 11/2018 | Naaman |
| 10,127,499 B1 | 11/2018 | Rigetti |
| 10,192,168 B2 | 1/2019 | Rigetti |
| 10,223,643 B1 | 3/2019 | Bishop et al. |
| 10,333,503 B1 | 6/2019 | Cohen et al. |
| 10,454,459 B1 | 10/2019 | Cohen |
| 10,496,069 B2 | 12/2019 | Nazarathy et al. |
| 10,505,524 B1 | 12/2019 | Cohen |
| 10,560,076 B1 | 2/2020 | Cohen |
| 10,637,449 B1 | 4/2020 | Cohen et al. |
| 10,659,018 B1 | 5/2020 | Cohen |
| 10,666,238 B1 | 5/2020 | Cohen |
| 10,958,253 B1 | 3/2021 | Cohen et al. |
| 10,985,739 B2 | 4/2021 | Cohen et al. |
| 11,010,145 B1 | 5/2021 | Smith et al. |
| 11,115,043 B1* | 9/2021 | Simon .................. H03M 1/004 |
| 11,463,075 B2 | 10/2022 | Cohen et al. |
| 11,616,497 B2 | 3/2023 | Cohen et al. |
| 11,616,498 B2 | 3/2023 | Cohen et al. |
| 2002/0004876 A1 | 1/2002 | Timmer et al. |
| 2004/0266084 A1 | 12/2004 | Fujishima et al. |
| 2005/0015422 A1 | 1/2005 | Kohn et al. |
| 2005/0180575 A1 | 8/2005 | Maeda et al. |
| 2006/0093376 A1 | 5/2006 | Mitchell et al. |
| 2008/0037693 A1 | 2/2008 | Andrus et al. |
| 2009/0268901 A1 | 10/2009 | Lodewyck et al. |
| 2010/0072979 A1 | 3/2010 | Fefer et al. |
| 2011/0035511 A1 | 2/2011 | Biederman |
| 2013/0198499 A1 | 8/2013 | Dice et al. |
| 2016/0125311 A1 | 5/2016 | Fuechsle et al. |
| 2016/0267032 A1 | 9/2016 | Rigetti et al. |
| 2016/0292586 A1 | 10/2016 | Rigetti et al. |
| 2017/0094618 A1 | 3/2017 | Bjorkengren |
| 2017/0214410 A1 | 7/2017 | Hincks et al. |
| 2017/0364796 A1 | 12/2017 | Wiebe |
| 2018/0013426 A1 | 1/2018 | Deurloo et al. |
| 2018/0032893 A1 | 2/2018 | Epstein |
| 2018/0091244 A1 | 3/2018 | Abdo |
| 2018/0107579 A1 | 4/2018 | Chapman |
| 2018/0123597 A1 | 5/2018 | Sete |
| 2018/0237039 A1 | 8/2018 | Mong et al. |
| 2018/0260245 A1 | 9/2018 | Smith |
| 2018/0260730 A1 | 9/2018 | Reagor |
| 2018/0260732 A1 | 9/2018 | Bloom |
| 2018/0308007 A1 | 10/2018 | Amin |
| 2018/0322409 A1 | 11/2018 | Barends |
| 2018/0365585 A1 | 12/2018 | Smith |
| 2018/0373995 A1 | 12/2018 | Tomaru et al. |
| 2018/0375650 A1 | 12/2018 | Legre |
| 2019/0042964 A1 | 2/2019 | Elsherbini et al. |
| 2019/0042965 A1 | 2/2019 | Clarke |
| 2019/0042970 A1 | 2/2019 | Zou |
| 2019/0042971 A1 | 2/2019 | Zou |
| 2019/0042972 A1 | 2/2019 | Zou |
| 2019/0042973 A1 | 2/2019 | Zou |
| 2019/0049495 A1 | 2/2019 | Ofek |
| 2019/0251478 A1 | 8/2019 | Bishop et al. |
| 2019/0266512 A1 | 8/2019 | Shen et al. |
| 2019/0302832 A1 | 10/2019 | Morgan et al. |
| 2019/0317589 A1 | 10/2019 | Mathur et al. |
| 2019/0385088 A1 | 12/2019 | Naaman et al. |
| 2020/0293080 A1 | 9/2020 | Poon et al. |
| 2020/0364602 A1 | 11/2020 | Niu et al. |
| 2021/0004707 A1 | 1/2021 | Gambetta et al. |
| 2021/0091755 A1 | 3/2021 | Cohen et al. |
| 2021/0103847 A1 | 4/2021 | Akzam |
| 2021/0125096 A1 | 4/2021 | Puri et al. |
| 2021/0359670 A1 | 11/2021 | Cohen et al. |

FOREIGN PATENT DOCUMENTS

| | | |
|---|---|---|
| CN | 104467843 A | 3/2015 |
| CN | 105281886 A | 1/2016 |
| CN | 105912070 A | 8/2016 |
| CN | 107408223 A | 11/2017 |
| CN | 108111306 A | 6/2018 |
| CN | 108594214 A | 9/2018 |
| CN | 108698815 A | 10/2018 |
| CN | 109165744 A | 1/2019 |
| CN | 110085094 A | 8/2019 |
| CN | 108780129 A | 11/2019 |
| CN | 110677210 A | 1/2020 |
| CN | 111464154 A | 7/2020 |
| CN | 111767055 A | 10/2020 |
| CN | 112019193 A | 12/2020 |
| CN | 112149832 A | 12/2020 |
| EP | 0388052 A2 | 9/1990 |
| JP | 09-321747 | 12/1997 |
| JP | 2000-49759 | 2/2000 |
| JP | 2007049009 A | 2/2007 |
| JP | 2009-68949 | 4/2009 |
| JP | 2011175078 A | 9/2011 |
| JP | 2011-211412 | 10/2011 |
| JP | 2012188875 A | 10/2012 |
| JP | 2018137739 A | 8/2018 |
| WO | 2015178991 A2 | 11/2015 |
| WO | 2015178992 A2 | 11/2015 |
| WO | 2017078735 A1 | 5/2017 |
| WO | 2017123940 A | 7/2017 |
| WO | 2017139683 A1 | 8/2017 |
| WO | 2018055607 A1 | 3/2018 |
| WO | 2018062991 A1 | 4/2018 |
| WO | 2019063117 A1 | 4/2019 |
| WO | 2020033807 A1 | 2/2020 |
| WO | 2020231795 A1 | 11/2020 |
| WO | 2021123903 A1 | 6/2021 |

OTHER PUBLICATIONS

Kang et al.(Year: 2023).*
Japanese Office Action Appln No. 2024-503888 dated Mar. 7, 2025.
Japanese Patent Office Action Appln No. 2023-042662 dated Apr. 22, 2024 with translation.
Extended European Search Report Appln No. 22795078.9 dated Feb. 7, 2025.
Int'l Search Report and Written Opinion Appln No. PCT/IB2024/062016 mailed Apr. 9, 2025.
W. D. Kalfus et al., "High-Fidelity Control of Superconducting Qubits Using Direct Microwave Synthesis in Higher Nyquist Zones," in IEEE Transactions on Quantum Engineering, vol. 1, pp. 1-12, 2020, doi: 10.1109/TQE.2020.3042895. W. D. Kalfus et al. Dec. 8, 2020 (Dec. 8, 2020).
Lavoie et al., "A Formalization for Specifying and Implementing Correct Pull-Stream Modules," in arXiv preprint arXiv:1801.06144 (2018). (Year: 2018).
Fu et al., "A Microarchitecture for a Superconducting Quantum Processor," in 38.3 I EEE Micro 40-47 (2018). (Year: 2018).
Extended European Search Report Appln No. 20845965.1 dated Jun. 29, 2023.
European Office Communication with extended Search Report Appln No. 20861242.4 dated Jul. 7, 2023.
European Office Communication with extended Search Report Appln No. 23153085.8 dated Jul. 3, 2023.
Yang Yet Al: "FPGA-based electronic system for the control and readout of superconducting qubit systems", arxiv.org, Cornell Uni-

(56) References Cited

OTHER PUBLICATIONS versity Library, 201 Yang Yet al: "FPGA-based electronic system for the control and readout of superconducting qubit systems", arxiv.org, Cornell University Library, 201 Olin Library Cornell University Ithaca, NY 14853, Oct. 15, 2021 (Oct. 15, 2021), XP091078848.
Gebauer Richard et al: "A modular RFSoC-based approach to interface superconducting quantum bits", 2021 International Conference on Field-Programmable Technology (ICFPT), IEEE, Dec. 6, 2021 (Dec. 6, 2021), pp. 1-9, XP034028257, DOI: 10.1109/ICFPT52863.2021.9609909 [retrieved on Nov. 8, 2021].
European Office Communication with extended Search Report Appln No. 20861100.4 dated Jul. 21, 2023.
Fu et al. "eQASM: An Executable Quantum 1-15 Instruction Set Architecture", 2019 IEEE International Symposium on High Performance Computer Architecture (HPCA), IEEE Feb. 16, 2019 (Feb. 16, 2019), pp. 224-237, XP033532496, DOI: 10.1109/HPCA.2019.00040 Retrieved from the Internet: URL: https://ieeexplore.ieee.org/abstract/document/8675197/authors#authors [retrieved on Mar. 26, 2019].
Yunong Shi et al: "Optimized Compilation of Aggregated Instructions for Realistic Quantum Computers", arxiv.org, Cornell University Library, 201 Olin Library Cornell University Ithaca, NY 14853, Feb. 4, 2019 (Feb. 4, 2019), XP081025321, DOI: 10.1145/3297858.3304018.
Chinese Patent Office Action Appln No. 2019800888907 with search report dated Jul. 28, 2023 with translation.
European Office Communication with extended Search Report Appln No. 20869503.1 dated Sep. 12, 2023.
Chinese Office Action Appln No. 2019800902340 with search report dated Aug. 30, 2023 with translation.
Int'l Preliminary Report on Patentability Appln No. PCT/IB2022/050190 mailed Oct. 19, 2023.
Int'l Preliminary Report on Patentability Appln No. PCT/IB2022/000068 mailed Nov. 23, 2023.
Int'l Preliminary Report on Patentability Appln No. PCT/IB2022/000059 mailed Nov. 23, 2023.
Int'l Preliminary Report on Patentability Appln No. PCT/IB2022/000024 mailed Nov. 9, 2023.
European Office Communication with extended Search Report Appln No. 20902662.4.6 dated Dec. 21, 2023.
Int'l Preliminary Report on Patentability Appln No. PCT/IB2022/054903 mailed Dec. 28, 2023.
Int'l Preliminary Report on Patentability Appln No. PCT/IB2022/053304 mailed Feb. 1, 2024.
Chinese Office Action Appln No. 2019800888907 dated Nov. 17, 2023.
U.S. Appl. No. 62/294,966, filed Feb. 12, 2016.
Int'l Search Report and Written Opinion Appln No. PCT/IB2019/001410 mailed Jun. 10, 2020.
Int'l Search Report and Written Opinion Appln No. PCT/IB2019/001394 mailed Jun. 17, 2020.
Zhang J, Hegde SS, Suter D. Pulse sequences for controlled 2-and 3-qubit gates in a hybrid quantum register. arXiv preprint arXiv:1806.08408. Jun. 21, 2018.
Wang CY, Kuznetsova L, Gkortsas VM, Diehl L, Kaertner FX, Belkin MA, Belyanin A, Li X, Ham D, Schneider H, Grant P. Mode-locked pulses from mid-infrared quantum cascade lasers. Optics Express. Jul. 20, 2009;17(15):12929-43.
Int'l Search Report and Written Opinion Appln No. PCT/IB2020/000218 mailed Aug. 11, 2020.
Quan R, Zhai Y, Wang M, Hou F, Wang S, Xiang X, Liu T, Zhang S, Dong R. Demonstration of quantum synchronization based on second-order quantum coherence of entangled photons. Scientific reports. Jul. 25, 2016;6:30453. Jul. 25, 2016 (Jul. 25, 2016).
Int'l Search Report and Written Opinion Appln No. PCT/IB2020/000376 mailed Sep. 17, 2020.
Breitfelder et al. eds., IEEE 100: The Authoritative Dictionary of IEEE Standards Terms 1247, definition 2 of "variable" (7th ed. 2000). (Year: 2000).
Int'l Search Report and Written Opinion Appln No. PCT/IB2020/000707 mailed Jan. 12, 2021.
National Academies of Sciences, Engineering, and Medicine. "Quantum Computing: Progress and Prospects". eprint (Dec. 2018) [online]. [retrieved on Jan. 7, 2020]. retrieved from: <https://doi.org/10.17226/25196.> Dec. 4, 2018 (Dec. 4, 2018) pp. 114, 142, 210, Fig. 2.5, Qiskit Backend Specifications at footnote 57: section 4.2, 5.1.5, Fig. 3, Fig. 4, pp. 30, 57.
IBM Research. "Qiskit Backend Specifications for OpenQASM and OpenPulse Experiments". eprint arXiv:1809.03452v1 (Sep. 10, 2018) [online]. [retrieved on Jan. 7, 2020]. retrieved from: <https://arxiv.org/pdf/1809.03452.pdf> Sep. 10, 2018 (Sep. 10, 2018) section 4.2, 5.1.5, Fig. 3, Fig. 4 , pp. 30, 57.
Int'l Search Report and Written Opinion Appln No. PCT/IB2020/000704 mailed Jan. 17, 2021.
Wolfowicz, et al. Pulse Techniques for Quantum Information Processing University of Chicago, University College London, eMagRes, 2016, vol. 5: 1515-1528. DOI 10.1002/9780470034590.emrstm1521.
Int'l Search Report and Written Opinion Appln No. PCT/IB2020/000555 mailed Dec. 27, 2020.
Int'l Search Report and Written Opinion Appln No. PCT/IB2020/000760 mailed Jan. 27, 2021.
"Quantum-classical interface based on single flux quantum digital logic". In: Quantum Science and Technology 3.2 (2018), pp. 1-16. DOI: 10.1088/2058-9565/aaa3a0.(retrieved on Jan. 20, 2021). Retrieved from the Internet: <https://arxiv.org/pdf/1710.04645.pdf> McDermott R. et al. Oct. 12, 2017 (Oct. 12, 2017) Section VI, VII, VIII.
Roffe, J., Quantum Error Correction: An Introductory Guide, Dept. of Physics & Astronomy, Univ. of Sheffeld, UK, Oct. 10, 2019, pp. 1-29.
Int'l Search Report and Written Opinion Appln No. PCT/IB2020/001004 mailed May 13, 2021.
Int'l Preliminary Report on Patentability Appln No. PCT/IB2019/001410 mailed Jun. 10, 2021.
Int'l Search Report and Written Opinion Appln No. PCT/IB2021/000067 mailed Jun. 21, 2021.
Int'l Preliminary Report on Patentability Appln No. PCT/IB2019/001394 mailed Jul. 29, 2021.
Int'l Preliminary Report on Patentability Appln No. PCT/IB2020/000218 mailed Sep. 16, 2021.
Int'l Preliminary Report on Patentability Appln No. PCT/IB2020/000376 mailed Nov. 12, 2021.
Int'l Search Report and Written Opinion Appln No. PCT/IB2021/056254 mailed Dec. 1, 2021.
Ribeiro, Diogo C., Pedro M. Cruz, and Nuno Borges Carvalho, "Towards a denser frequency grid in phase measurements using mixer-based receivers." 2015 85th Microwave Measurement Conference (ARFTG). IEEE, 2015. Dec. 31, 2015 (Dec. 31, 2015).
Int'l Preliminary Report on Patentability Appln No. PCT/IB2020/000555 mailed Feb. 10, 2022.
Int'l Preliminary Report on Patentability Appln No. PCT/IB2020/000707 mailed Mar. 17, 2022.
Int'l Preliminary Report on Patentability Appln No. PCT/IB2020/000704 mailed Mar. 17, 2022.
Int'l Preliminary Report on Patentability Appln No. PCT/IB2020/000760 mailed Apr. 7, 2022.
Int'l Search Report and Written Opinion Appln No. PCT/IB2022/050190 mailed Apr. 11, 2022.
Int'l Search Report and Written Opinion Appln No. PCT/IB2022/000059 mailed Jul. 7, 2022.
Moreira , "QuTech Central Controller: A Quantum Control Architecture for a Surface-17 Logical Qubit." Delft University of Technology Student Theses Collection (2019). Available at the following URL: http://resolver.tudelft.nl/uuid:502ed5e5-87f7-42bd-a077-c24b7281cd94 May 10, 2019 (May 10, 2019).
Int'l Preliminary Report on Patentability Appln No. PCT/IB2020/001004 mailed Jun. 30, 2022.
Int'l Search Report and Written Opinion Appln No. PCT/IB2022/000024 mailed Jul. 18, 2022.
Baier, Simon, Matteo Pompili, Sophie LN Hermans, Hans KC Beukers, Peter C. Humphreys, Raymond N. Schouten, Raymond FL Vermeulen et al. "Realization of a Multi-Node Quantum Network of

(56) References Cited

OTHER PUBLICATIONS

Remote Solid-State Qubits", Science, vol. 372, pp. 259-264 (2021) Baier Simon Apr. 16, 2021 (Apr. 16, 2021).

Int'l Search Report and Written Opinion Appln No. PCT/IB2022/000068 mailed Jul. 17, 2022.

D. Copsey et al., "Toward a scalable, silicon-based quantum computing architecture," in IEEE Journal of Selected Topics in Quantum Electronics, vol. 9, No. 6, pp. 1552-1569, Nov.-Dec. 2003, doi: 10.1109/JSTQE.2003.820922. Dec. 31, 2003 (Dec. 31, 2003).

Extended European Search Report Appln No. 19889443.8 dated Aug. 4, 2022.

Int'l Search Report and Written Opinion Appln No. PCT/IB2022/054903 mailed Sep. 8, 2022.

Int'l Preliminary Report on Patentability Appln No. PCT/IB2021/000067 mailed Sep. 22, 2022.

Int'l Search Report and Written Opinion Appln No. PCT/IB2022/053304 mailed Oct. 6, 2022.

Serrano, Javier, M. Lipinski, T. Wlostowski, E. Gousiou, Erik van der Bij, M. Cattin, and G. Daniluk. "The white rabbit project." (2013) Sep. 19, 2013 (Sep. 19, 2013) Entire document.

Extended European Search Report Appln No. 19910800.2 dated Oct. 6, 2022.

Hornibrook J M et Al: "Cryogenic Control Architecture for Large-Scale Quantum Computing", arxiv.org, Cornell University Library, 201 Olin Library Cornell University Ithaca, NY 14853, Sep. 8, 2014 (Sep. 8, 2014), XP081391509.

Fu X et al: "An Experimental Microarchitecture for a Superconducting Quantum Processor", MICRO-50 '17: Proceedings of the 50th Annual IEEE/ACM International Symposium on Microarchitecture, Cornell University Library, 201 Olin Library Cornell University Ithaca, NY 14853, Oct. 14, 2017 (Oct. 14, 2017), pp. 1-13, XP081291220.

Zopes J. et al: "High resolution quantum sensing with shaped control pulses", arxiv.org, Cornell University Library, 201 Olin Library Cornell University Ithaca, NY 14853, May 22, 2017 (May 22, 2017), XP081276850.

Cross et al. "Open Quantum Assembly Language", Jan. 10, 2017.

European Office Communication with extended Search Report Appln No. 20766036.6 dated Nov. 24, 2022.

Japanese Patent Office Action Appln No. 2021-529723 dated Oct. 26, 2022 with translation.

* cited by examiner

HIGH RESOLUTION, DIRECT SYNTHESIS OF QUBIT CONTROL SIGNALS

BACKGROUND

Limitations and disadvantages of conventional methods and systems for generation and distribution of qubit control signals will become apparent to one of skill in the art, through comparison of such approaches with some aspects of the present method and system set forth in the remainder of this disclosure with reference to the drawings.

BRIEF SUMMARY

Methods and systems are provided for generation and distribution of qubit control signals, substantially as illustrated by and/or described in connection with at least one of the figures, as set forth more completely in the claims.

DETAILED DESCRIPTION

Figure 1:
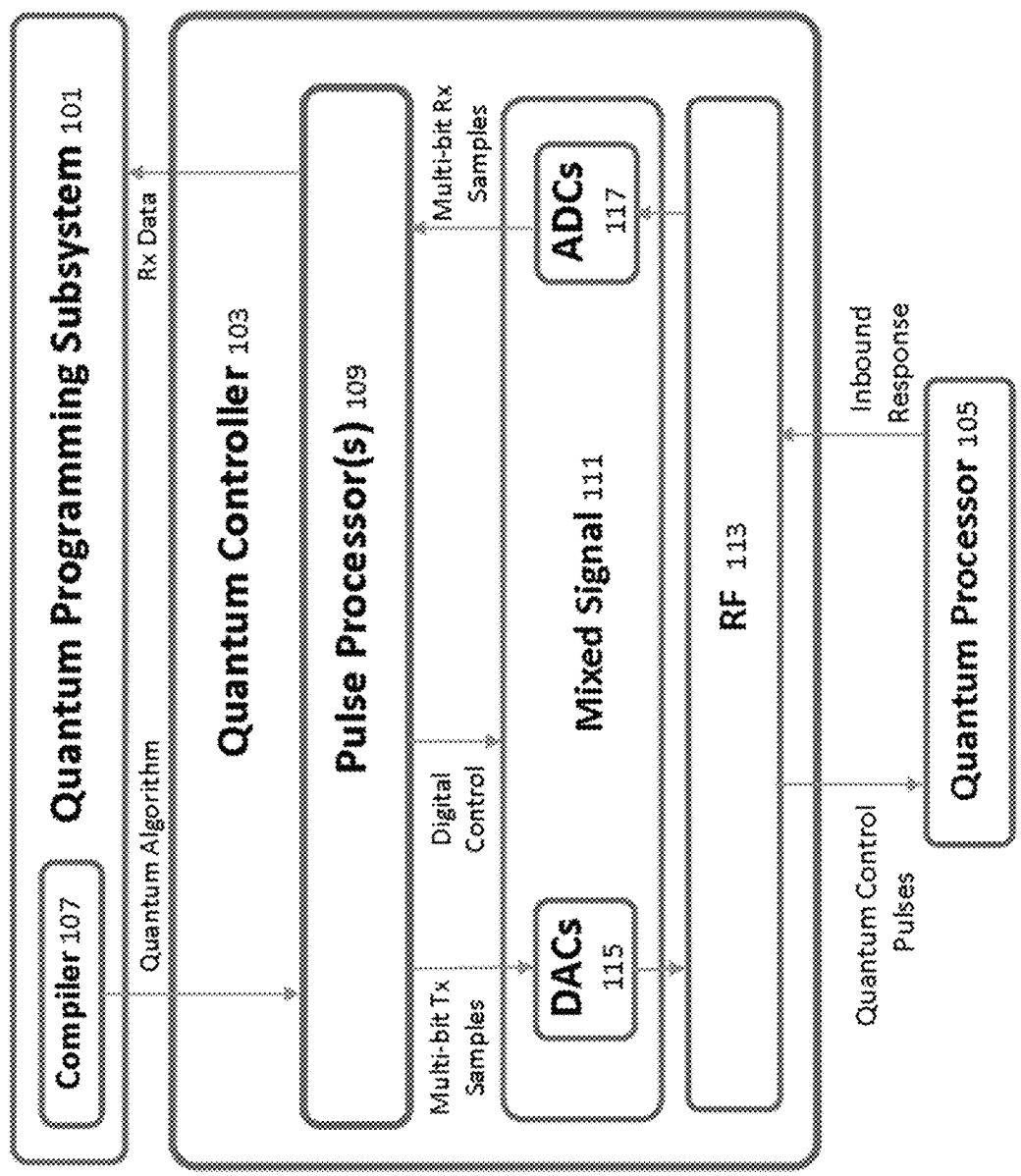
FIG. 1 illustrates an example quantum orchestration platform (QOP) in accordance with various example implementations of this disclosure.

A Quantum Orchestration Platform (QOP) is a collection of processing units and analog components that produce synchronized analog RF pulses, readouts, and computations. Qubits are controlled using the analog RF pulses in a multi-GHz regime. Each qubit control is localized around a specific frequency in a relatively narrow band. However, the range of all qubits in the system can span a multi-GHz range. Analog RF pulses are typically generated by upconverting a signal in the multi-MHz regime using a mixer.

In quantum computing, one of the biggest obstacles facing scientists and engineers is the highly dynamic and varied nature of qubit frequencies. Unlike traditional radar and communication systems, which rely on fixed and well-defined frequency ranges, a full quantum processing system that utilizes multiple qubits requires the ability to generate and control pulses across an extremely wide range of frequencies. In these systems, each qubit operates at its own unique frequency, which can change significantly during normal operation, making it extremely challenging to control and manipulate the quantum state of the system. Furthermore, for two-qubit quantum gates, even a wider dynamical frequency range is needed.

This is in contrast with traditional communication technology where the frequency range and operation are well-established, and standardized, and do not change in the same way as in quantum computing. It highlights the need for specialized tools and techniques to tackle this issue in quantum computing, specifically an instrument that can supply narrow-band pulses which are spanned across a very wide frequency range. Without this specialized instrument, progress in the field of quantum computing will be hindered. Tools and technologies to effectively control qubit frequencies are necessary in order to harness the full potential of quantum computing.

Disclosed herein is a new paradigm for qubit control using clock multipliers and dual sampling rate direct synthesis to avoid Nyquist zone gaps while covering a wide spectrum without using any synthesizer that compromises the phase noise. This system and method for multi-Nyquist direct synthesis qubit control using clock multipliers and double sampling rate is scalable to thousands of RF channels synchronized to the picosecond level.

Classical computers operate by storing information in the form of binary digits ("bits") and processing those bits via binary logic gates. At any given time, each bit takes on only one of two discrete values: 0 (or "off") and 1 (or "on"). The logical operations performed by the binary logic gates are defined by Boolean algebra and circuit behavior is governed by classical physics. In a modern classical system, the circuits for storing the bits and realizing the logical operations are usually made from electrical wires that can carry two different voltages, representing the 0 and 1 of the bit, and transistor-based logic gates that perform the Boolean logic operations.

Logical operations in classical computers are performed on fixed states. For example, at time 0 a bit is in a first state, at time 1 a logic operation is applied to the bit, and at time 2 the bit is in a second state as determined by the state at time 0 and the logic operation. The state of a bit is typically stored as a voltage (e.g., 1 $V_{dc}$ for a "1" or 0 $V_{dc}$ for a "0"). The logic operation typically comprises one or more transistors.

Obviously, a classical computer with a single bit and single logic gate is of limited use, which is why modern classical computers with even modest computation power contain billions of bits and transistors. That is to say, classical computers that can solve increasingly complex problems inevitably require increasingly large numbers of bits and transistors and/or increasingly long amounts of time for carrying out the algorithms. There are, however, some problems which would require an infeasibly large number of transistors and/or infeasibly long amount of time to arrive at a solution. Such problems are referred to as intractable.

Quantum computers operate by storing information in the form of quantum bits ("qubits") and processing those qubits via quantum gates. Unlike a bit which can only be in one state (either 0 or 1) at any given time, a qubit can be in a superposition of the two states at the same time. More precisely, a quantum bit is a system whose state lives in a two dimensional Hilbert space and is therefore described as a linear combination $\alpha|0\rangle + \beta|1\rangle$, where $|0\rangle$ and $|1\rangle$ are two basis states, and $\alpha$ and $\beta$ are complex numbers, usually called probability amplitudes, which satisfy $|\alpha|^2+|\beta|^2=1$. Using this notation, when the qubit is measured, it will be 0 with probability $|\alpha|^2$ and will be 1 with probability $|\beta|^2$. The basis states $|0\rangle$ and $|1\rangle$ can also be represented by two-dimensional basis vectors $$\begin{bmatrix}1\\0\end{bmatrix} \text{ and } \begin{bmatrix}0\\1\end{bmatrix},$$

respectively. The qubit state may represented by $$\begin{bmatrix} \alpha \\ \beta \end{bmatrix}.$$

The operations performed by the quantum gates are defined by linear algebra over Hilbert space and circuit behavior is governed by quantum physics. This extra richness in the mathematical behavior of qubits and the operations on them, enables quantum computers to solve some problems much faster than classical computers. In fact, some problems that are intractable for classical computers may become trivial for quantum computers.

Unlike a classical bit, a qubit cannot be stored as a single voltage value on a wire. Instead, a qubit is physically realized using a two-level quantum mechanical system. For example, at time 0 a qubit is described as $$\begin{bmatrix} \alpha_1 \\ \beta_1 \end{bmatrix},$$

at time 1 a logic operation is applied to the qubit, and at time 2 the qubit is described as $$\begin{bmatrix} \alpha_2 \\ \beta_2 \end{bmatrix}.$$

Many physical implementations of qubits have been proposed and developed over the years. Some examples of qubits implementations include superconducting circuits, spin qubits, and trapped ions.

FIG. 1 illustrates an example quantum orchestration platform (QOP) in accordance with various example implementations of this disclosure. The QOP comprises a quantum programming subsystem 101, a quantum controller (QC) 103 and a quantum processor 105.

The quantum programming subsystem 101 comprises a compiler 107 that is operable to generate machine code from a high-level quantum algorithm description. The machine code comprises a series of binary vectors that represent instructions that the QC 103 can interpret and execute directly, to generate the necessary outbound quantum control pulses for the quantum algorithm, with little or no human intervention during runtime. The outbound quantum control pulses are coupled to the quantum processor 105 to execute the quantum algorithm.

In an example implementation, the quantum programming system 101 is a personal computer comprising a processor, memory, and other associated circuitry (e.g., an x86 or x64 chipset). The quantum programming subsystem 101 may be coupled to the QC 103 via an interconnect which may, for example, utilize a universal serial bus (USB), a peripheral component interconnect (PCIe) bus, wired or wireless Ethernet, or any other suitable communication protocol.

The QC 103 generates the precise series of external signals (e.g., pulses of electromagnetic waves and pulses of baseband voltage) to perform the desired logic operations to carry out the desired quantum algorithm via the quantum processor 105. For example, pulses of electromagnetic waves may be sent to one or more qubits in the quantum processor 105, thereby manipulating a state of the qubits. One or more readout resonators in the quantum processor 105 may be configured to read the state of the qubits and pass this information back to the QC 103. Depending on the quantum algorithm to be performed, outbound pulse(s) for carrying out the algorithm may be predetermined at design time and/or during runtime. The runtime determination of the pulses may require classical calculations and processing in the QC 103. This runtime analysis may be based on inbound pulses received from the quantum processor 105.

During runtime and/or upon completion of a quantum algorithm performed by the QC 103, the QC 103 may output data/results to the quantum programming subsystem 101. In an example implementation, these results may be used to generate a new quantum algorithm description for a subsequent run of the quantum algorithm and/or update the quantum algorithm description during runtime.

A QC 103 comprises one or more pulse processors 109, which may be implemented in a field programmable gate array, an application specific integrated circuit or the like. The pulse processor 109 may be a baseband pulse generation unit such as an arbitrary waveform generator (AWG). The pulse processor 109 is operable to control outbound pulses that drive a quantum element (e.g., one or more qubits, qubit resonators, resonator feed lines, qubit drive lines, and couplers) in the quantum processor 105. A pulse processor 109 is also operable to receive inbound pulses from a quantum element, to perform runtime analysis for example.

Quantum algorithms are performed by one or more quantum elements of the quantum processor 105 interacting with quantum control pulses. The quantum processor 105 consists of several quantum elements, e.g., qubits, resonators and flux line. A readout resonator is coupled to the qubits. The resonating frequency of a resonator depends on the qubit state. Sending an outbound pulse from the QC to the resonator would result in an inbound response back to the QC that depends on the qubit state which can be extracted by classical computation. A flux line is an element that can couple 2 qubits to perform a 2 qubit gate, or to a single qubit to manipulate its state and resonating frequency.

A quantum control pulse may be an electromagnetic RF signal. The electromagnetic RF signals may be generated by upconverting a baseband or intermediate frequency (IF) analog waveform in an RF circuit 113. Alternatively, RF signals may be directly modulated as will be discussed further. The pulse processor 109 may digitally generate and modify samples of the analog waveform.

The pulse processor 109 is configured to execute the control flow of a quantum algorithm program using one or more classical processors. The classical processors are able to perform classical computations and impact the flow of the quantum program and/or the transmitted pulses. A classical processor may be configured to control a physical layer module to generate analog waveforms and digital signaling. The pulse processor 109 may be configured to shape and modulate the analog waveforms according to control signals from the classical processor. These control signals may also depend on the previous measurements.

The digital signaling may be used as digital markers that follow the analog pulses as the analog pulses are fed through the mixed signal circuit 111 and the RF circuit 113. The digital marker may be used to: activate laboratory auxiliary measurement equipment (e.g., a scope, a photon detector), operate auxiliary equipment that is essential to execute the program, dynamically control a digital gate, and capture the inbound readout response of the qubits to send the user raw data for post processing and analysis. The dynamic control of the digital gate may enable the analog waveform transmission to the quantum element, while the QC 103 plays analog data to the quantum element to reduce noise when not playing to the element.

The analog waveforms are sent to various DAC channels 115 in a mixed signal circuit 111. The DACs 115 are operable to convert the analog waveforms from a digital representation to an analog signal that is modulated, upconverted (as necessary) by the RF circuit 113 and used to excite a quantum element such as a qubit in a quantum processor 105. To generate results from the quantum algorithm program, the pulse processor(s) 109 are also operable to receive, via one or more downconverters in the RF circuit 113 and ADCs 117 in the mixed signal circuit 111, readout responses from a resonator in the quantum processor 105. The classical processor(s) in the pulse processor(s) 109 are operable to perform state estimation on the readout responses to affect the program dynamic branching as well as result generation. Any classical parameter (e.g. frequency, phase, chirp rate, etc. . . . ) may also be modified according to previous measurements.

While individual components may be verified to some extent standalone, a full system validation is required to ensure that the integrated products work as a unit. Typically, the validation of one quantum controller requires the acquisition of a set of analog signals that are processed and checked against expected results. Difficulty arises because the DAC converters used for acquisition may add noise and distortion to a purely digital outbound signal. Validating a large set of quantum controllers is typically even more difficult due to the scale-up. A complex hardware switch is usually required to dynamically route such a large set of DAC outputs into a small set of scope channels.

The disclosed validation system does not require an expensive hardware switch or a manual connection of DAC outputs to limited scope channels. The disclosed validation system does not require complex data analysis to remove noise from the captured analog data. The disclosed validation system is automated, scalable and accurate to a selectable resolution of the DACs. The sample rate and resolution of the DAC itself may be limited. For example, a DAC that is unable to operate higher than 12 GHz may still generate spectrum in the 16 GHz range.

Figure 2:
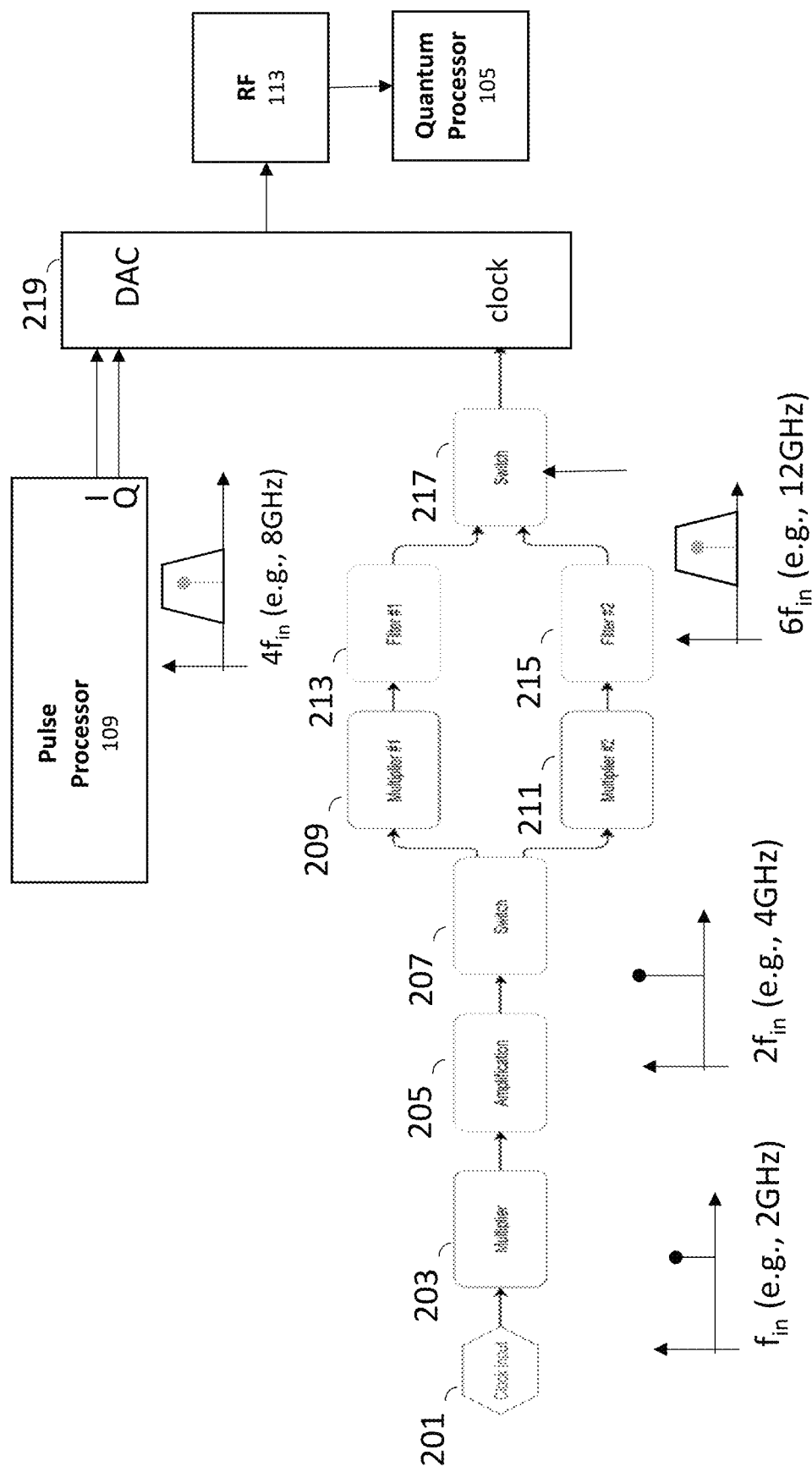
FIG. 2 illustrates an example of a DAC with a variable sample frequency, in accordance with various example implementations of this disclosure.

FIG. 2 illustrates an example of a digital-to-analog converter (DAC) 219 with a variable sample clock, in accordance with various example implementations of this disclosure. The DAC 219 in FIG. 2 is operably coupled to clock circuitry comprising a clock input 201, three multipliers 203, 209, 211, an amplifier 205, two switches 207, 217 and two filters 213, 215. The variable sample clock of the DAC is generated by two different analog multipliers 209, 211, using RF switches 207, 217. Filters 213, 215 are added to avoid cross-clock contamination for spectral purity.

The clock seed for these multipliers 209, 211 can arise from another multiplier 203 if needed. For example, starting from 2 GHz, the first multiplier 203 doubles the frequency to 4 GHz. Then this frequency is doubled 209 or tripled 211 to 8 GHz or 12 GHz. This clock is then fed into the DAC 219 clock input. By alternating between 8 GHz and 12 GHz, the clock can cover the full spectrum from side to side with no gaps around the maximum sample frequency (e.g., 12 GHz).

The pulse processor 109 is configured to generate a digital quantum control pulse (e.g., a complex I/Q signal). The DAC is configured to generate an analog quantum control pulse according to the digital quantum control pulse and a DAC clock. The analog quantum control pulse is communicatively coupled, via RF upconversion 113, to a quantum element (e.g., qubit or readout) in a quantum processor 105.

The clock circuitry is configured to dynamically generate the DAC clock according to a clock input 201 and a clock selection at switch 217. The clock selection is among a plurality of frequencies (e.g., 8 GHZ and 12 GHz). The plurality of frequencies may comprise a first multiple (e.g., 4×) of the clock input (e.g., 2 GHZ) and a second multiple (e.g., 6×) of the clock input (e.g., 2 GHZ). The DAC clock may be selected according to an overlap between two Nyquist zones to cover a wide frequency range for the analog quantum control pulse.

Figure 3:
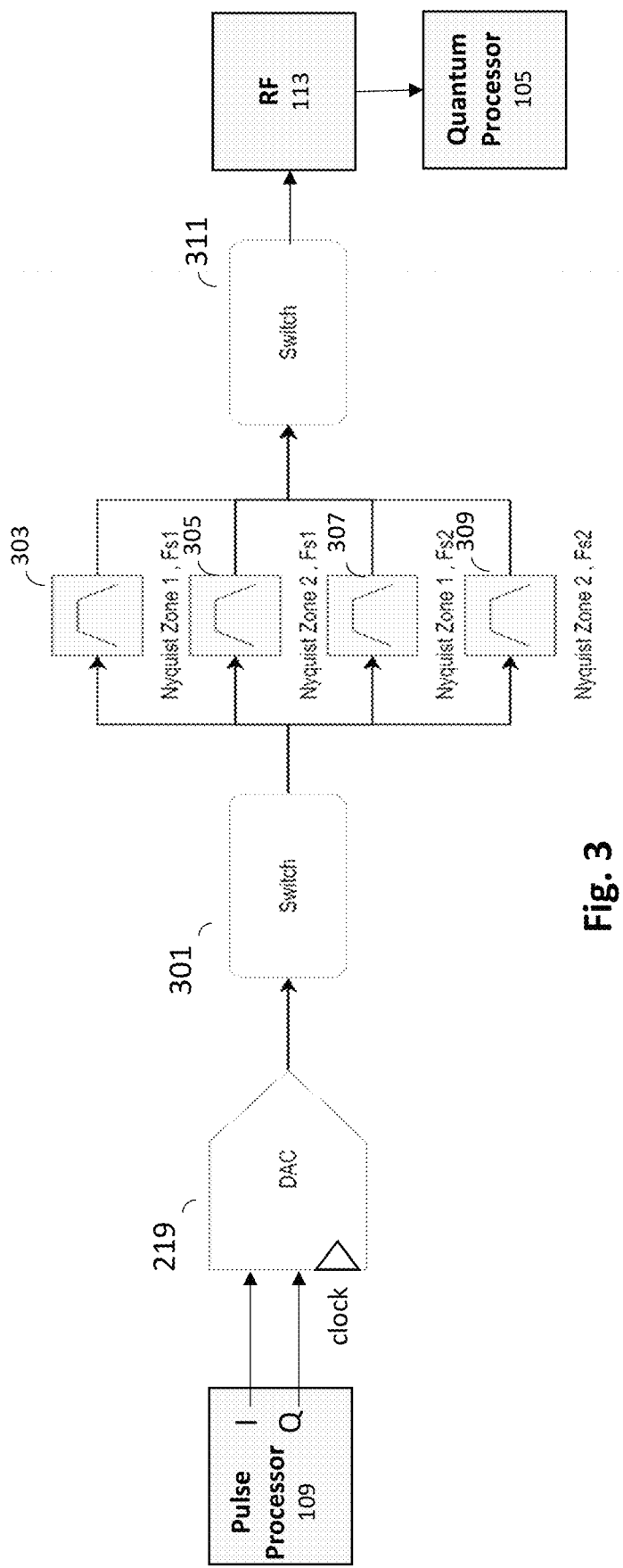
FIG. 3 illustrates an example system for controlling the output of a DAC with a variable sample frequency, in accordance with various example implementations of this disclosure.

FIG. 3 illustrates an example system for controlling the output of a DAC 219 with a variable sample clock, in accordance with various example implementations of this disclosure. In FIG. 3, the DAC 219 is operably coupled to a circuit comprising two switches 301, 311 and four filters 303, 305, 307, 309. The output from the DAC 219 depends on the sample clock and the filter 303, 305, 307 or 309 switched in. The filter bank 303, 305, 307, 309 is communicatively coupled to receive the analog quantum control pulse output from the DAC 219. The filter bank 303, 305, 307, 309 is dynamically controlled via switches 301, 311 according to the clock selection described below in reference to FIG. 4.

Figure 4:
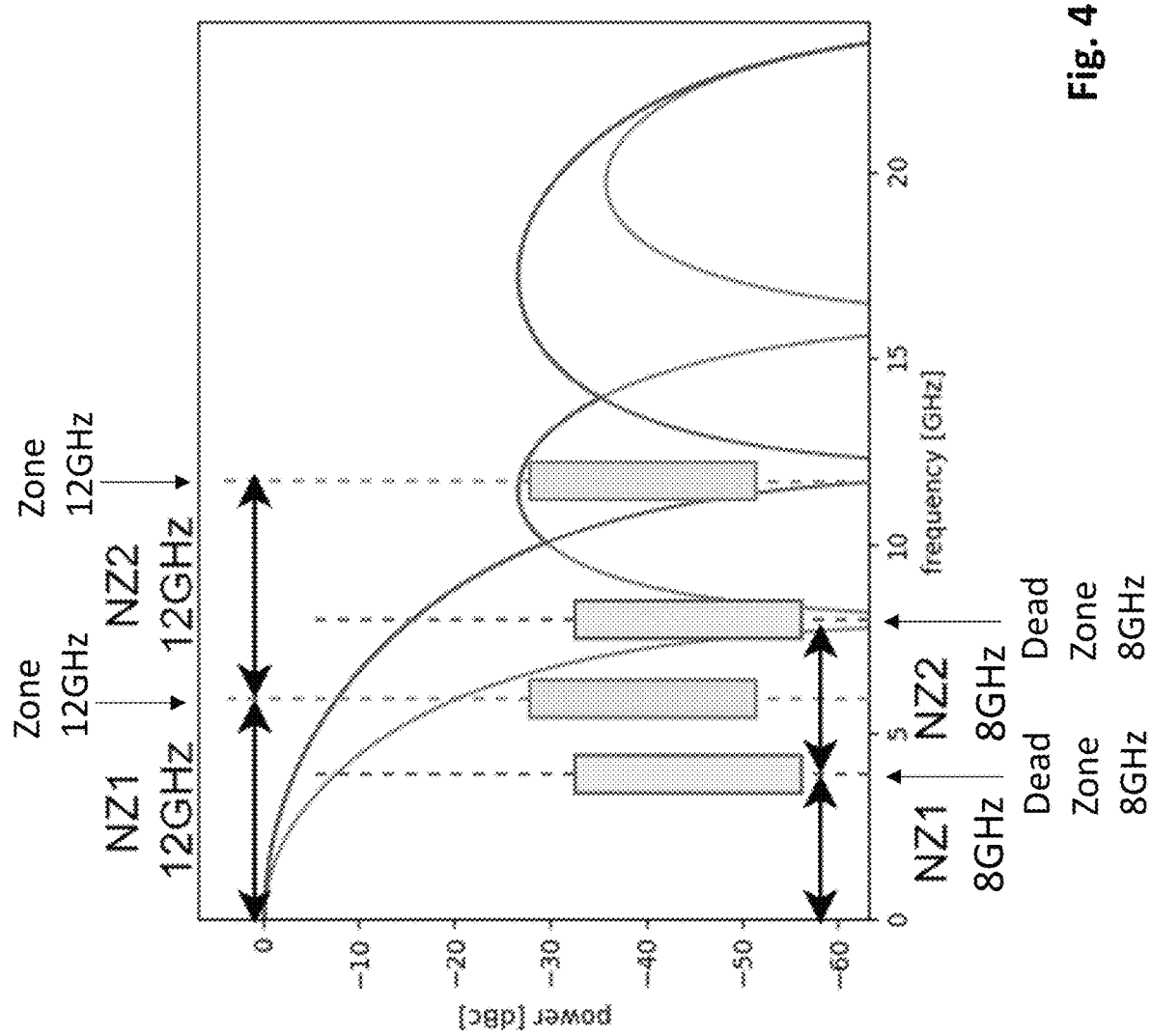
FIG. 4 illustrates an example spectrum of the output of a DAC with a variable sample frequency, in accordance with various example implementations of this disclosure.

FIG. 4 illustrates an example spectrum of the output of the DAC 219 with a variable sample frequency, in accordance with various example implementations of this disclosure. The DAC clock is dynamically determined according to the analog quantum control signal. In accordance with various embodiments, the analog quantum control signal is located in a Nyquist zone of a frequency response waveform associated with the DAC clock. For example, the first two Nyquist zones of the frequency response waveform associated with the 8 GHz DAC clock are DC to 4 GHz and 4 GHz to 8 GHz. Similarly, the first two Nyquist zones of the frequency response waveform associated with the 12 GHz DAC clock are DC to 6 GHz and 6 GHz to 12 GHz. If, for example, the analog quantum control signal happens to be near 4 GHz, the clock circuitry would select the DAC clock to be 12 GHz.

Figure 5:
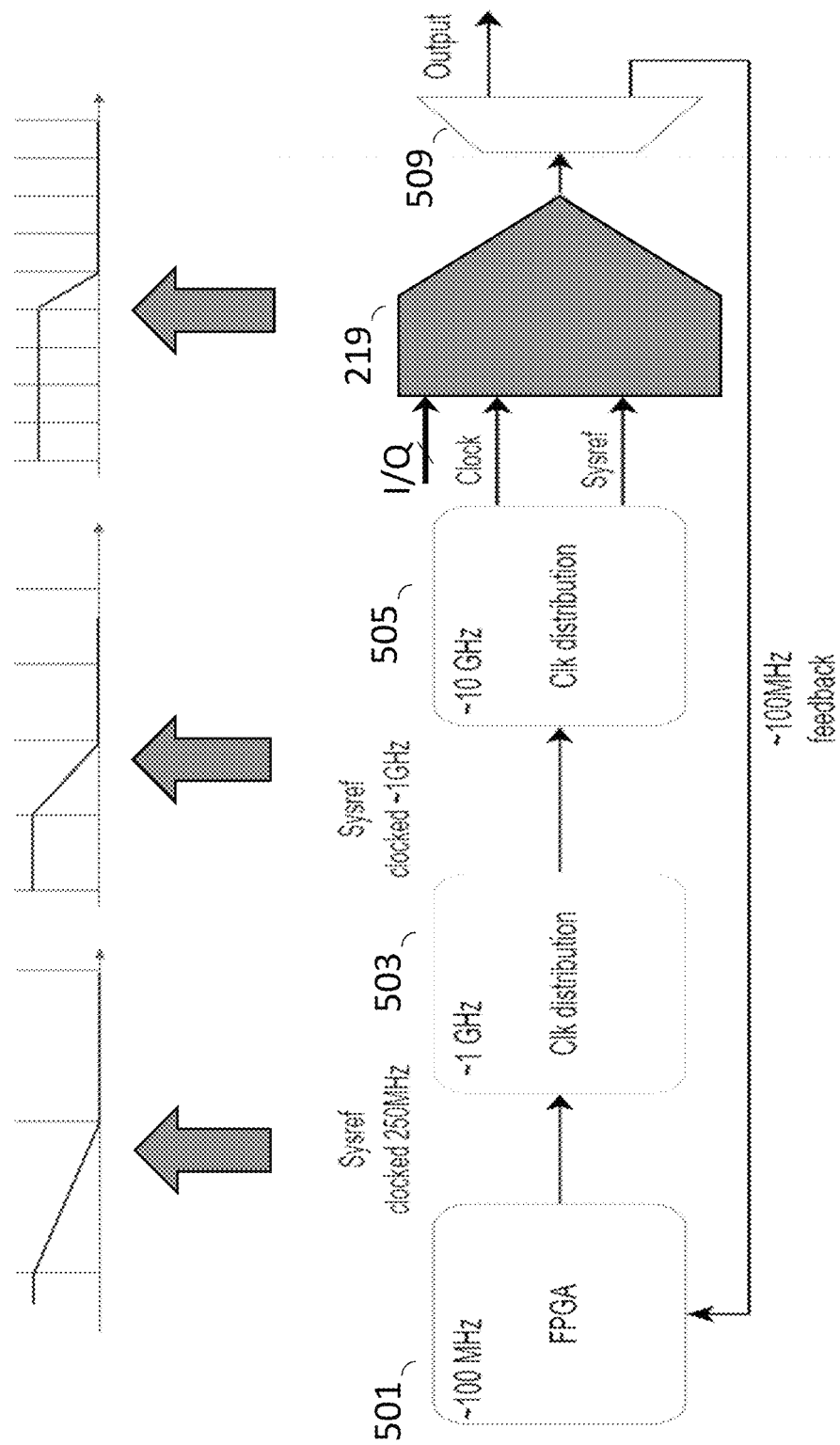
FIG. 5 illustrates an example system for the distribution and synchronization of clock signals, in accordance with various example implementations of this disclosure.

In accordance with various embodiments the analog quantum control signal is located at a maximum possible distance from a dead zone of a frequency response waveform associated with the DAC clock. As illustrated in FIG. 5, a dead zone refers to a region at the edge of the Nyquist zone. Regarding the clock selections, the quantitative determination of "near to" or "far from" a dead zone can be based on a comparison among the plurality of choices for a clock frequency. For example, given a particular analog quantum control signal spectrum, the attenuation of the particular analog quantum control signal according to the frequency response waveform associated with the 8 GHz DAC clock may be compared to the attenuation of the particular analog quantum control signal according to the frequency response waveform associated with the 12 GHz DAC clock. The DAC clock with the least attenuation may be selected.

In order to support multi-Nyquist zones, a dedicated filter bank 303, 305, 307, 309 was designed at the DAC 219 output. Using double sample rate interpolation, via digital interpolation and upconversion logic, the Nyquist image of the RF can be significantly reduced, allowing pulses to be generated on the full broadband spectrum output without compromising RF performance, to provide sub-Nyquist rate digital-to-analog conversion technique for a direct waveform synthesis (DWS) transmitter. The variable clock rate allows the signal generator to convert the digital baseband samples to RF frequencies in the target channels obviating the upconversion mixer.

The DWS output includes image tones around the clock and its harmonic frequencies. These image tones are also usable, enabling the DWS to generate much higher frequency tones. Filtering is required to make use of these super-Nyquist frequencies by eliminating undesired tones, especially the fundamental.

In RF processing, there is typically a requirement to generate a signal of precise frequency and high purity. Often the application calls for an agile signal such that the generated frequency must be able to shift quickly while maintaining precision of instantaneous frequency and phase. DWS is a natural choice for generating such signals, as it has complete flexibility offered by digital processing—the waveform voltage values are stored in memory and converted to the desired signal by a digital-to-analog converter (DAC). The input clock sets the rate at which the voltage values of the DWS are output to the DAC. Frequency is determined by a stepping algorithm that determines the address increment in the DWS ROM lookup. The desired transmission waveforms can be extracted from the second or third Nyquist zone by a bandpass filter.

FIG. 5 illustrates an example system for the distribution and synchronization of clock signals, in accordance with various example implementations of this disclosure. The system comprises a clock distributor 503, 505 that tracks (and is coherent with) a system reference signal. The system is configured to feedback the system reference signal to maintain synchronicity between the digital and/or analog quantum control pulse and the clock input. The feedback of a reference signal maintains synchronicity and coherence between the analog quantum control pulse and a system reference signal.

In FIG. 5, the DAC 219 is operably coupled to a circuit comprising two clock distributors 503, 505, an FPGA 501 and a mux 509. Quantum control requires multi-synchronized DACs and ADCs across multiple DACs in the same instrument and between instruments connected as a cluster. This can be achieved usually using a master clock that supplies a system reference signal (SYSREF) that propagates across the full system. However, this is difficult on a large scale, both due to the unknown and changing delays of the different distribution components and cables, while requiring a high signal purity and low phase noise.

To overcome this challenge, the disclosed method ensures that the latency of all DACs and ADCs connected to the same FPGA 501 or other digital unit is the same up to picoseconds and is known up to picoseconds. This latency is measured from a specific clock cycle edge of the FPGA 501 or the other digital unit until the DAC 219 outputs the sample that was sent to it during the clock cycle. Similarly for the ADC the latency is measured from a specific sampling of the ADC until the clock edge of the FPGA 501 or other digital unit that receives it (in an agreed register).

The FPGA 501 that feeds the DACs, and is fed by the ADCs, generates a low frequency SYSREF. This SYSREF is then sampled twice each time using a clock in the next order of magnitude to reach the accuracy, repeatability, deterministic and low phase noise required by high-speed components such as the DAC 219.

A loopback method is used to avoid any uncertainty regarding the exact clock cycle to be cached by the SYSREF. This loopback is connected directly to the FPGA 501 that originated the SYSREF, and the FPGA 501 measures the offset in sub ns resolution. The FPGA 501 sends a signal to the DAC 219, via clock distribution 503, 505 like a reset. For example, as the DAC 219 plays, the FPGA 501 will listen and then the FPGA 501 will know the alignment between the reset it sent to what the DAC 219 is actually playing. However, the FPGA 501 is very jittery when the FPGA 501 is operating at hundreds of MGz. Because a full cycle on the DAC 219 is around 100 picosecond (1/10 GHz), the DAC 219 may receive an unpredictable cycle.

The first clock distributor 503 can capture from the FPGA 501 at low frequencies (e.g., 1 GHz). Because the SYSREF is less jittery (and lower frequency) than this 1 GHz, the clock distribution 503 will detect it correctly. The SYSREF output from the first clock distributor 503 is higher quality than the SYSREF output from the FPGA 501. Furthermore, the second clock distributor 505 will achieve a higher quality signal from the output of the first clock distributor 503.

The FPGA 501 output has a very shallow slope and is also very jittery. However, the output from the first clock distributor 503 is very sharp and always aligned properly to the clock of the system such that the DAC 505 will be time aligned.

Upon initialization, the DAC 219 will wake up at a random time when you just start up the system or change frequency clock to the DAC 219. The clock wakes up at some random shift, it can be one sample behind, two samples behind, three samples behind or a few samples behind. Each sample is around 100 picoseconds, so one time, the system may turn on 100 picosecond forward, and another time, the system may turn on one time it is 100 picoseconds back. The FPGA 501 will output signals that will populate through the clock distributors 505, 505 and get very accurately to the DAC 219. The DAC 219 will play something and then the FPGA 219 will sample what was played. Therefore, if the DAC 219 outputs 100 picoseconds forward in this scenario, the FPGA 501 would detect it is 100 picoseconds forward and move the signal 100 picoseconds back. The loop mechanism allows the detection of offsets due to jitter.

Figure 6:
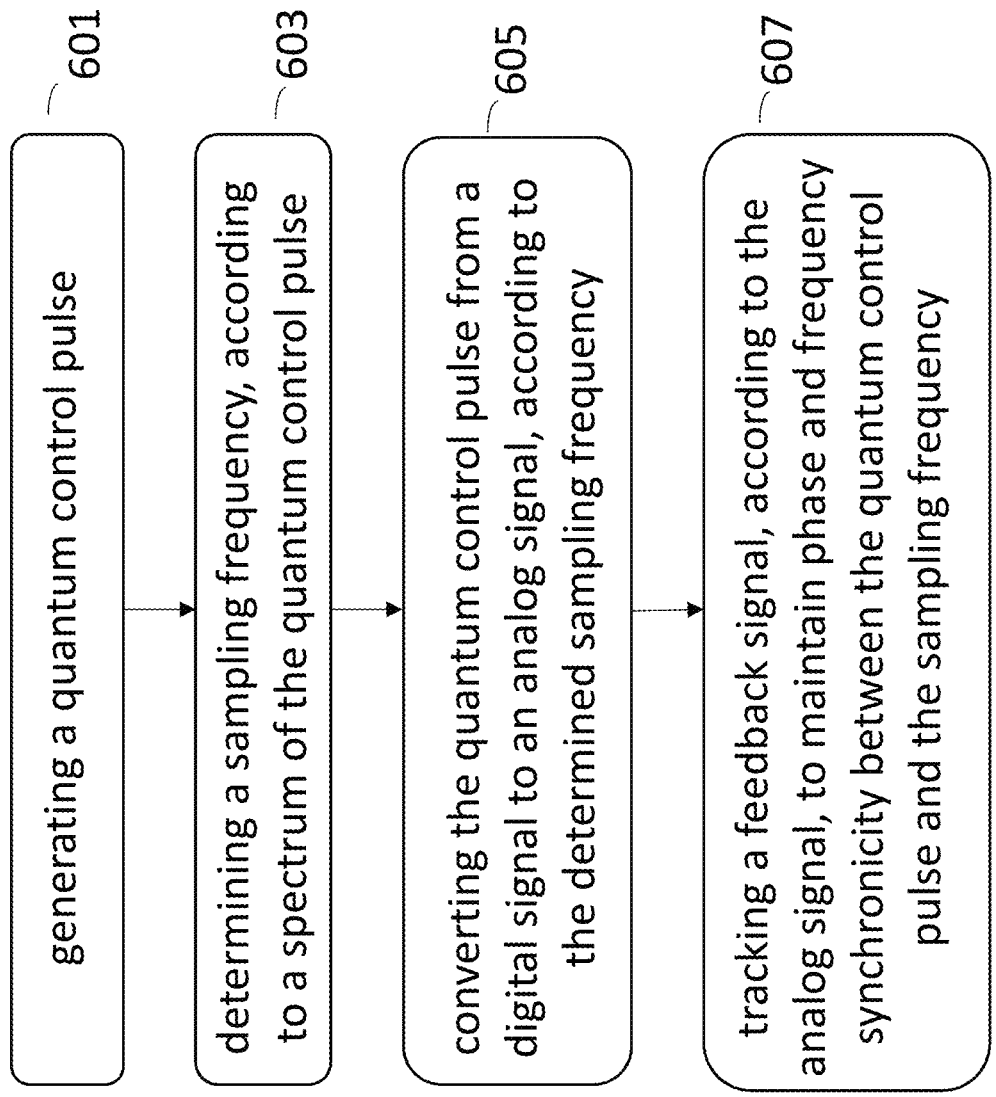
FIG. 6 illustrates an example method for high resolution, direct synthesis of qubit control signals, in accordance with various example implementations of this disclosure.

FIG. 6 illustrates an example method for high resolution, direct synthesis of qubit control signals, in accordance with various example implementations of this disclosure. The method of FIG. 6 comprises generating a quantum control pulse at 601, determining a sampling frequency, according to a spectrum of the quantum control pulse, at 603, converting the quantum control pulse from a digital signal to an analog signal, according to the determined sampling frequency, at 605, and tracking a feedback signal, according to the analog signal, to maintain phase and frequency synchronicity between the quantum control pulse and the sampling frequency at 607. The digital samples of the quantum control pulse may be generated dynamically according to the determined sampling frequency. Alternatively, the digital samples of the quantum control pulse may be dynamically interpolated and/or decimated to account for non-integer relationships among the plurality of DAC clocks. Alternatively, the digital samples of the quantum control pulse may be generated at the least common multiple of the plurality of DAC clocks. For example, 24 GHz digital samples may be sampled at either 8 GHz or 12 GHz, thereby eliminating the need for a DAC to operate as high as 24 GHz.

The present method and/or system may be realized in hardware, software, or a combination of hardware and software and may consist of an individual system or computer, or a system comprised of multiple systems or computers (i.e. cloud computing and cloud storage service). The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical implementation may comprise one or more application specific integrated circuit (ASIC), one or more field programmable gate array (FPGA), and/or one or more processor (e.g., x86, x64, ARM, PIC, and/or any other suitable processor architecture) and associated supporting circuitry (e.g., storage, DRAM, FLASH, bus interface circuits, etc.). Each discrete ASIC, FPGA, Processor, or other circuit may be referred to as "chip," and multiple such circuits may be referred to as a "chipset." Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to perform processes as described in this disclosure. Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to be configured (e.g., to load software and/or firmware into its circuits) to operate as a system described in this disclosure.

As used herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As used herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As used herein, the term "exemplary" means serving as a non-limiting example, instance, or illustration. As used herein, the terms "e.g.," and "for example" set off lists of one or more non-limiting examples, instances, or illustrations. As used herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, the term "based on" means "based at least in part on." For example, "x based on y" means that "x" is based at least in part on "y" (and may also be based on z, for example).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising:
a baseband pulse generation unit configured to generate a digital quantum control pulse;
a digital-to-analog converter (DAC) configured to generate an analog quantum control pulse according to the digital quantum control pulse and one or more DAC clocks, wherein the analog quantum control pulse is communicatively coupled to an element in a quantum system; and
clock circuitry configured to dynamically generate the one or more DAC clocks according to a clock input and a clock selection, wherein:
the clock selection is among a plurality of frequencies;
each of the plurality of frequencies is selected to meet a desired frequency band along with one of a plurality of Nyquist zones of the DAC; and
a reconstruction filter impulse response of the DAC is determined according to a selected Nyquist zone.

2. The system of claim 1, wherein the baseband pulse generation unit is one of an arbitrary waveform generator and a pulse processor.

3. The system of claim 1, wherein the plurality of frequencies comprises a first multiple of the clock input and a second multiple of the clock input.

4. The system of claim 1, wherein:
the clock circuitry comprises a multiplier and a filter, and an output of the multiplier passes through the filter to generate the one or more DAC clocks.

5. The system of claim 1, wherein:
the digital quantum control pulse is a complex signal.

6. The system of claim 1, wherein:
the element in the quantum system is one of a qubit, a qubit resonator, a resonator feed line, a qubit drive line, and a coupler.

7. The system of claim 1, wherein:
the one or more DAC clocks are dynamically determined, such that the analog quantum control signal is located in a Nyquist zone of a frequency response associated with the one or more DAC clocks.

8. The system of claim 1, wherein:
the one or more DAC clocks are dynamically determined, such that the analog quantum control signal is located at a maximum possible distance from a dead zone of a frequency response associated with the one or more DAC clocks.

9. The system of claim 1, wherein:
the system comprises a filter bank communicatively coupled to receive the analog quantum control pulse output from the DAC, and
the filter bank is dynamically controlled according to the clock selection.

10. The system of claim 1, wherein:
the system comprises a clock distributor coherent with a system reference signal.

11. The system of claim 1, wherein:
the system is configured to feedback a reference signal to maintain synchronicity and coherence between the analog quantum control pulse and a system reference signal.

12. The system of claim 1, wherein the DAC comprises digital interpolation and upconversion logic.

13. The system of claim 1, wherein:
the one or more DAC clocks are selected with an overlap between two or more Nyquist zones.

14. A method comprising:
generating a digital quantum control pulse using a baseband pulse generation unit;
generating an analog quantum control pulse, via a digital-to-analog converter (DAC), according to the digital quantum control pulse and one or more DAC clocks, wherein the analog quantum control pulse is communicatively coupled to an element in a quantum system;
dynamically generating the one or more DAC clocks, via clock circuitry, according to a clock input and a clock selection, wherein the clock selection is among a plurality of frequencies;
selecting each of the plurality of frequencies to meet a desired frequency band along with one of a plurality of Nyquist zones of the DAC; and
determining a reconstruction filter impulse response of the DAC according to a selected Nyquist zone.

15. The method of claim 14, wherein the baseband pulse generation unit is one of an arbitrary waveform generator and a pulse processor.

16. The method of claim 14, wherein the plurality of frequencies comprises a first multiple of the clock input and a second multiple of the clock input.

17. The method of claim 14, wherein:
the clock circuitry comprises a multiplier and a filter, and
the method comprises passing an output of the multiplier through the filter to generate the one or more DAC clocks.

18. The method of claim 14, wherein:
the digital quantum control pulse is a complex signal.

19. The method of claim 14, wherein:
the element in the quantum system is one of a qubit, a qubit resonator, a resonator feed line, a qubit drive line, and a coupler.

20. The method of claim 14, wherein the method comprises:
dynamically determining the one or more DAC clocks, such that the analog quantum control signal is located in a Nyquist zone of a frequency response associated with the one or more DAC clocks.

21. The method of claim 14, wherein the method comprises:
dynamically determining the one or more DAC clocks, such that the analog quantum control signal is located at a maximum possible distance from a dead zone of a frequency response associated with the one or more DAC clocks.

22. The method of claim 14, wherein:
the method comprises communicatively coupling a filter bank to receive the analog quantum control pulse output from the DAC, and
dynamically controlling the filter bank according to the clock selection.

23. The method of claim 14, wherein:
the method comprises coherently connecting a clock distributor with a system reference signal.

24. The method of claim 14, wherein:
the method comprises feeding back a reference signal to maintain synchronicity and coherence between the analog quantum control pulse and a system reference signal.

25. The method of claim 14, wherein the DAC comprises digital interpolation and upconversion logic.

26. The method of claim 14, wherein:
the method comprises selecting the one or more DAC clocks according to an overlap between two Nyquist zones.

* * * * *